(12) United States Patent
Okada

(10) Patent No.: US 12,292,616 B2
(45) Date of Patent: May 6, 2025

(54) OPTICAL ELEMENT, OPTICAL APPARATUS, AND IMAGE PICKUP APPARATUS

(71) Applicant: CANON KABUSHIKI KAISHA, Tokyo (JP)

(72) Inventor: Tadanori Okada, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 783 days.

(21) Appl. No.: 17/198,385

(22) Filed: Mar. 11, 2021

(65) Prior Publication Data
US 2021/0294065 A1    Sep. 23, 2021

(30) Foreign Application Priority Data

Mar. 18, 2020 (JP) .................................. 2020-047297

(51) Int. Cl.
*G02B 7/02* (2021.01)
*H04N 23/55* (2023.01)

(52) U.S. Cl.
CPC ............. *G02B 7/026* (2013.01); *G02B 7/021* (2013.01); *H04N 23/55* (2023.01)

(58) Field of Classification Search
CPC ........ G02B 7/026; G02B 7/021; G02B 7/027; G02B 7/02; G02B 5/003; G02B 5/005; H04N 23/55; G03B 9/02
See application file for complete search history.

(56) References Cited

U.S. PATENT DOCUMENTS

2017/0357147 A1* 12/2017 Takehana ............... H04N 9/317
2018/0164533 A1*  6/2018 Qiu ........................ G02B 13/18

FOREIGN PATENT DOCUMENTS

| JP | 59-202413 A | 11/1984 |
|---|---|---|
| JP | 2005-134719 A | 5/2005 |
| JP | 2011059396 A | 3/2011 |
| JP | 2013114103 A | 6/2013 |
| JP | 2013233215 A | 11/2013 |
| JP | 2017219785 A | 12/2017 |

OTHER PUBLICATIONS

Kazuya et al., JP 2011-0159396, English language machine translation generated Nov. 1, 2023 (Year: 2011).*
English machine translation of JP 2005-134719 A, generated May 1, 2024 (Year: 2005).*
Notice of Reasons for Refusal issued by the Japanese Patent Office on Jan. 18, 2024 in corresponding JP Patent Application No. 2020-047297, with English translation.
Notice of Reasons for Refusal issued by the Japanese Patent Office on Jun. 25, 2024 in corresponding JP Patent Application No. 2020-047297, with English translation.

* cited by examiner

*Primary Examiner* — Stephone B Allen
*Assistant Examiner* — Adam W Booher
(74) *Attorney, Agent, or Firm* — Carter, DeLuca & Farrell LLP

(57) ABSTRACT

Provided is a lens including: a circumferential groove formed in an outer periphery of the lens; and a light-shielding ring, which is provided in the circumferential groove, and is configured to shield light, the light-shielding ring having a ring shape.

10 Claims, 7 Drawing Sheets

OPTICAL ELEMENT, OPTICAL APPARATUS, AND IMAGE PICKUP APPARATUS

BACKGROUND OF THE INVENTION

Field of the Invention

The present disclosure relates to an optical element, an optical apparatus, and an image pickup apparatus.

Description of the Related Art

In a lens barrel to be used for a digital camera, a video camera, or the like, there has been proposed a configuration for preventing ghost or flare that is caused by radiation of an incident light beam onto an outer peripheral portion of a lens or a lens holding portion such as a caulked portion.

In Japanese Patent Application Laid-Open No. 2013-114103, there is a disclosure of an optical element suppressed in occurrence of ghost with the following configuration. Specifically, a groove is formed in an outer periphery of the optical element, and a black coating material is applied on the groove, thereby absorbing and blocking incident light.

However, in the case in which the black coating material is applied on the groove formed in the outer periphery as in Japanese Patent Application Laid-Open No. 2013-114103, a light beam may pass through the coating material when there is a variation in coating, with the result that ghost may occur.

SUMMARY OF THE INVENTION

The present disclosure has an object to provide an optical element reduced in occurrence of ghost in an easier way.

In order to achieve the above-mentioned object, according to the present disclosure, there is provided an optical element, including: a groove formed in an outer periphery of the optical element; and an elastic member, which is provided in the groove, and is configured to shield light, the elastic member having a ring shape.

According to the present disclosure, an optical element reduced in occurrence of ghost in an easier way can be provided.

Further features of the present invention will become apparent from the following description of exemplary embodiments with reference to the attached drawings.

DESCRIPTION OF THE EMBODIMENTS

Figure 1A:
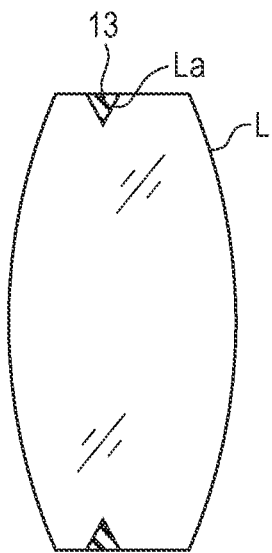
FIG. 1A and FIG. 1B are each a sectional view of a lens (L) according to an embodiment of the present disclosure.

Preferred embodiments of the present invention will now be described in detail in accordance with the accompanying drawings.

The line indicated by X-X in the drawings is a line passing through the center of a lens barrel (optical apparatus), and is hereinafter referred to as an optical axis X.

Figure 1B:
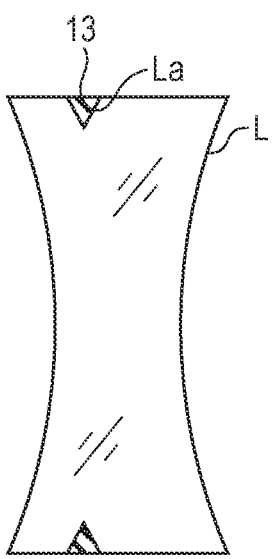

FIG. 1A and FIG. 1B are each a sectional view for illustrating a lens L (optical element) according to an embodiment of the present disclosure. The lens L according to the embodiment includes a circumferential groove La (groove) and a light-shielding ring 13 (elastic member). The circumferential groove La is formed in an outer periphery of the lens L. The light-shielding ring 13 is a light-shielding member provided in the circumferential groove La and configured to shield light.

The light-shielding ring 13 may be a ring made of an elastic material, for example, a ring made of black rubber. When the light-shielding ring 13 which has a ring shape and is made of an elastic material is mounted in the circumferential groove La, the light-shielding ring 13 is in contact with the circumferential groove La, and the circumferential groove La is sealed by the light-shielding ring 13. With such a lens L according to the embodiment, occurrence of ghost can be prevented reliably in an easier way. Although the lens L according to the embodiment of the present disclosure is illustrated as a convex lens or a concave lens, this is merely a mode, and the present disclosure is not limited to those shapes.

(Example)

Figure 2:
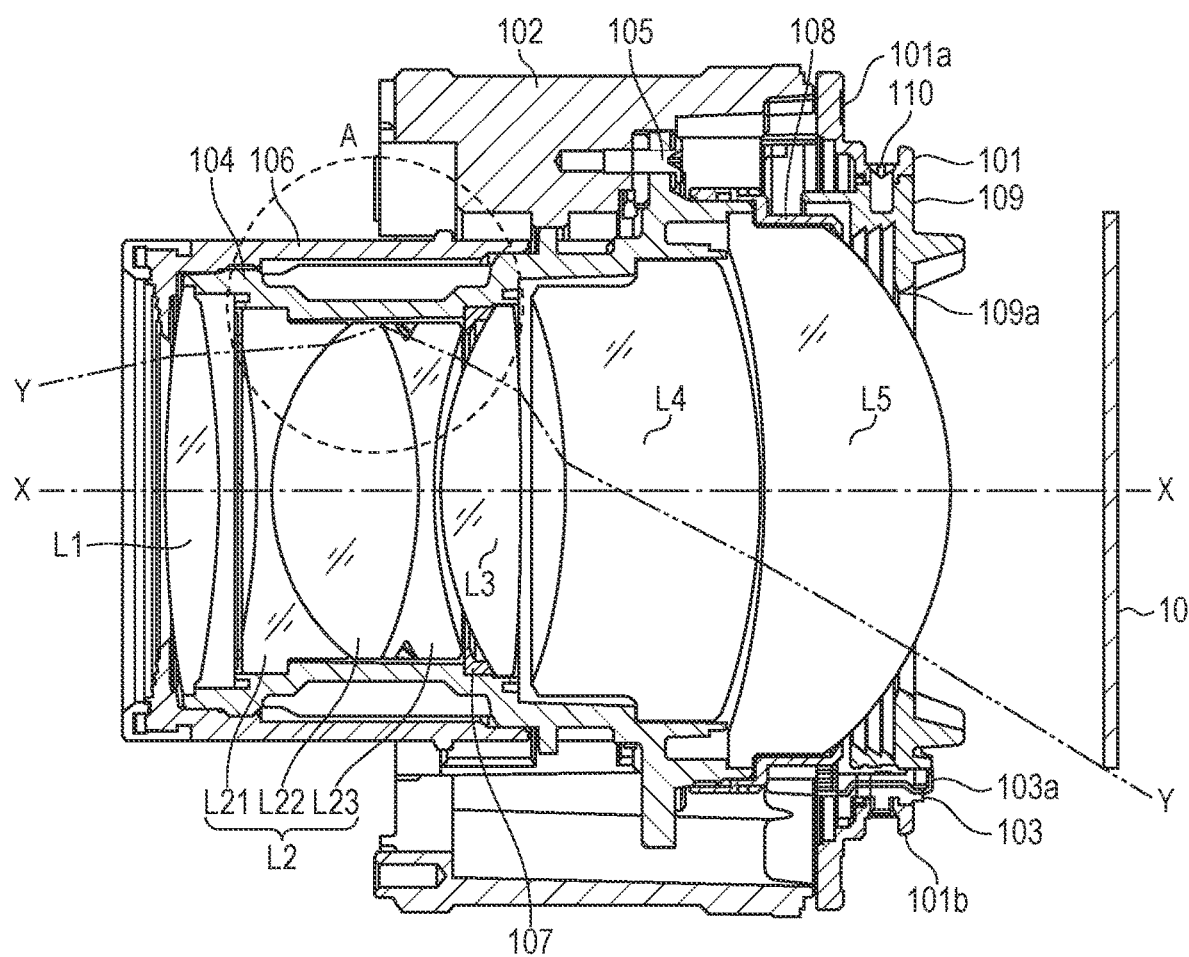
FIG. 2 is a sectional view of a lens barrel in the present disclosure.

Now, a lens barrel including a second lens L2 (optical element) to which the present disclosure is applied is described with reference to FIG. 2. FIG. 2 is a sectional view of the lens barrel including the second lens L2 to which the present disclosure is applied. In a direction of the optical axis X in the drawing, an object side of the lens barrel is defined as a front side, and an image plane side to be fixed to a camera main body (image pickup apparatus) (not shown) via a bayonet mount is defined as a rear side.

A mount 101 is a component for coupling a lens barrel main body and the camera main body (not shown) to each other. The mount 101 includes a contact surface 101a and bayonet claws 101b. The contact surface 101a is configured to perform positioning in the direction of the optical axis X. The bayonet claws 101b are provided at three positions at a rear end. The bayonet claws 101b are coupled to bayonet claws provided on the camera main body side, thereby holding the lens barrel main body and the camera main body in the coupled state. The mount 101 is fixed to a fixed barrel 102 with a screw (not shown).

A contact component 103 is fixed to the mount 101 with a screw (not shown), and is electrically connected to an electronic board via a flexible printed wiring board (not shown). The contact component 103 has a plurality of contacts 103a for allowing communication with the camera main body and power supply.

A lens frame 104 is fixed to the fixed barrel 102 with a screw 105. A first lens L1, the second lens L2, a third lens L3, a fourth lens L4, and a fifth lens L5 are mounted to the lens frame 104 in the stated order from the object side. That is, the lens barrel in the present disclosure includes the first lens L1 to the fifth lens L5 being a plurality of optical elements. Further, at least the second lens L2 of the plurality of optical elements is formed as a cemented lens in which three lenses including a first lens member L21, a second lens member L22, and a third lens member L23 are cemented with an adhesive.

An L1 presser ring 106 fixes the first lens L1 to the lens frame 104 by threads. The first lens member L21 side of the second lens L2 is fixed by caulking. Further, the third lens L3 is fixed to the lens frame 104 by caulking with a spacer ring 107 interposed therebetween. The spacer ring 107 positions the third lens L3 in the optical axis direction. Further, a radially inner portion of the spacer ring 107 forms an edge, and the edge blocks light so as to prevent stray light incident through the third lens member L23 from being reflected and reaching an image pickup surface 10. The image plane side of the fourth lens L4 is fixed by caulking, and the fifth lens L5 is fixed with an L5 presser ring 108 by threads.

A cover 109 is fixed to the mount 101 with a screw 110 and has an opening 109a in an inner periphery thereof. A light beam Y-Y incident from the first lens L1, which is indicated by an optical path of an alternate long and two short dashes line, passes through the opening 109a. The light beam Y-Y incident from the first lens L1, which is unnecessary for photographing, is reflected at a radially outer portion of the second lens L2 and reaches an end of the image pickup surface 10.

Figure 3:
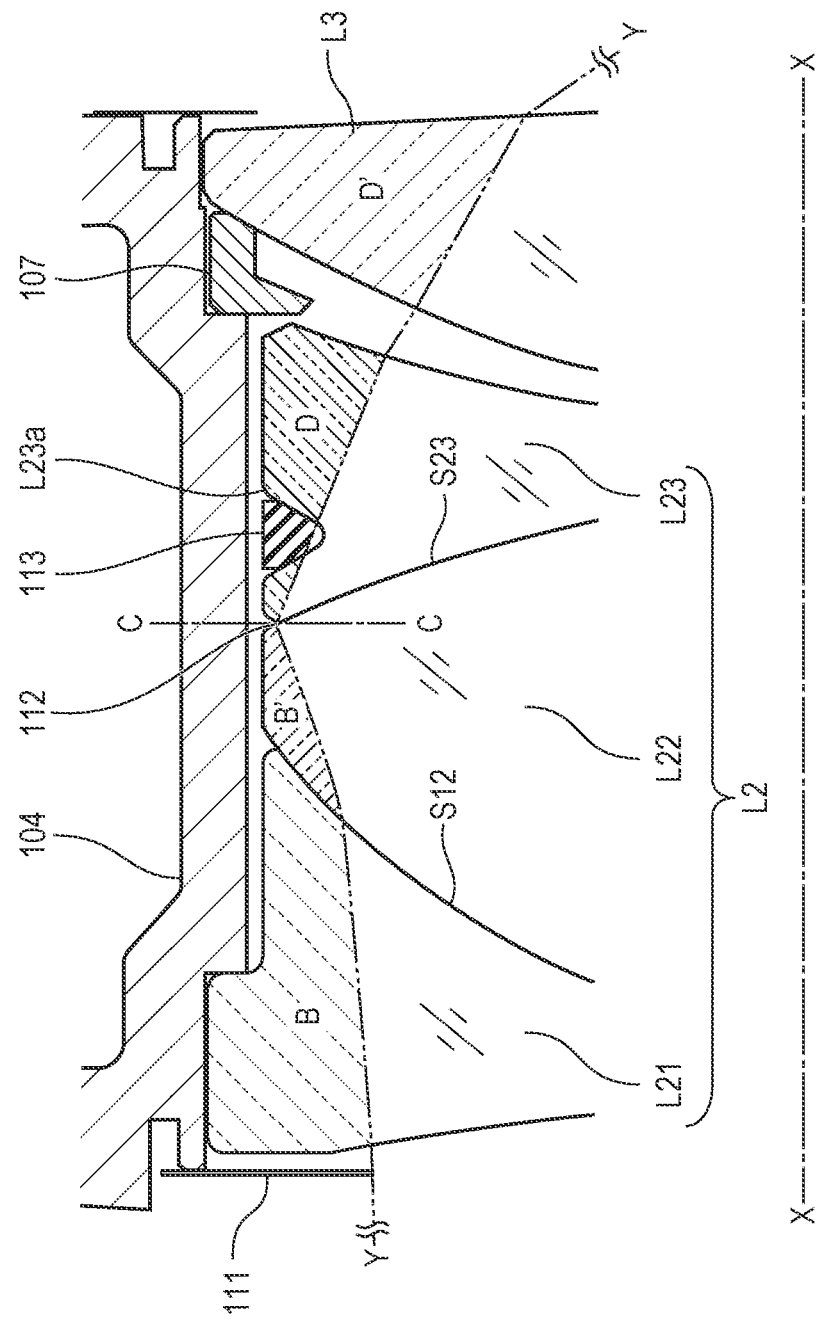
FIG. 3 is an enlarged sectional view of a region indicated by the broken line A of FIG. 2.
Figure 4:
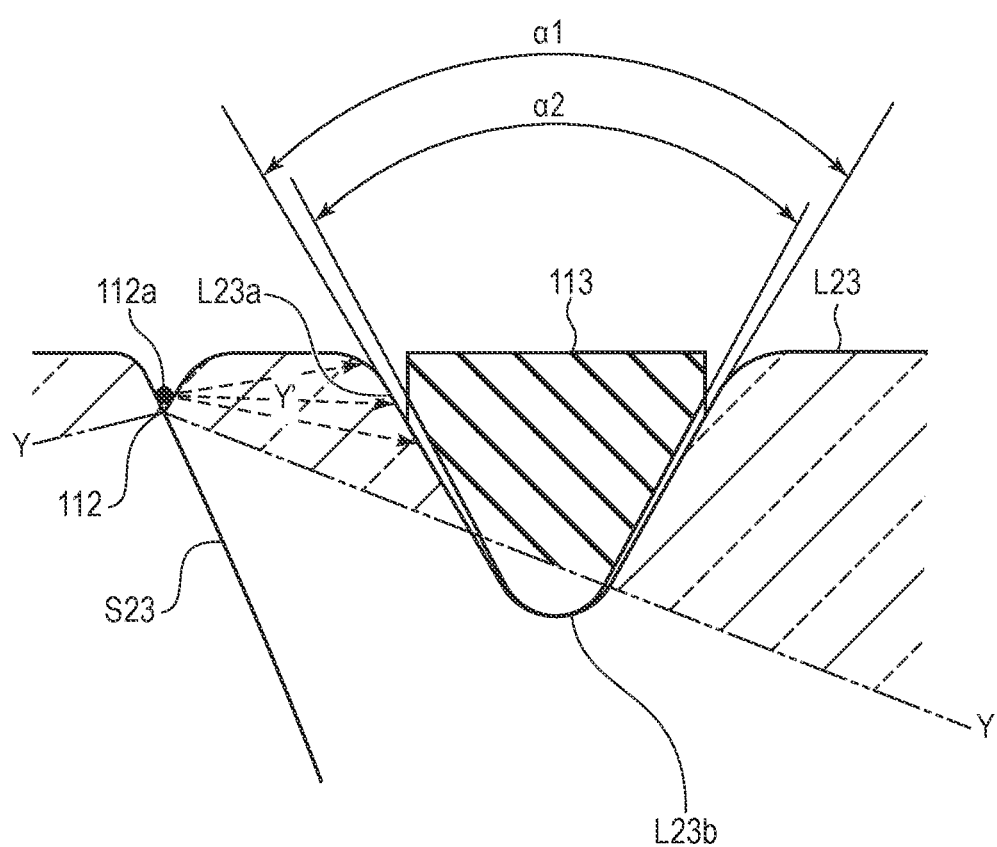
FIG. 4 is a partial sectional view for illustrating a state in which a light-shielding ring (113) is mounted in a circumferential groove (L23a) of a third lens member (L23).

Next, the example is described more in detail with reference to FIG. 3 and FIG. 4. FIG. 3 is an enlarged sectional view for illustrating the details of the second lens L2 formed as the cemented lens in a region indicated by the broken line A of FIG. 2. FIG. 4 is a partial sectional view for illustrating a state in which a light-shielding ring 113 (elastic member) is mounted in a circumferential groove L23a (groove) of the third lens member L23 forming the second lens L2. As illustrated in FIG. 4, the circumferential groove L23a having a substantially V shape is formed in an entire outer periphery of the third lens member L23 forming the second lens L2, and the light-shielding ring 113 is in contact with a bottom portion of the circumferential groove L23a (radially innermost portion L23b).

The light beam Y-Y passes through a radially inner portion of a light-shielding seat 11l and reaches the image pickup surface 10 while being refracted inside the second lens L2. An inner diameter of the light-shielding seat 111 is set to a minimum diameter that does not cause the light beam required for photographing to be blocked. In this setting, the light beam Y-Y does not enter a region on the outer peripheral side, which includes a cemented surface S12 between the first lens member L21 and the second lens member L22, that is, regions indicated by hatchings B and B'. However, the second lens member L22 and the third lens member L23 cannot be increased in outer diameter due to space restriction. Thus, the light beam Y-Y enters a cemented outer peripheral portion 112 (cemented portion) located on extension of a cemented surface S23 between the second lens member L22 and the third lens member L23. Here, the adhesive that has overflowed may accumulate at the cemented outer peripheral portion 112. When an adhesive accumulation 112a (see FIG. 4) is formed, the adhesive that has accumulated may serve as a secondary light source so that a stray light beam Y' is generated to reach the image pickup surface 10, with the result that ghost may occur.

The light beam Y-Y is shown as an optical path that reaches an end of an opposing corner of the image pickup surface 10 (point farthest from the optical axis X in the image pickup surface 10, see FIG. 2). In FIG. 3, the light beam Y-Y is reflected at the cemented outer peripheral portion 112, and the light beam Y-Y on the image plane side with respect to a line segment C-C does not reach the image pickup surface 10. However, the light that has entered the cemented outer peripheral portion 112 is diffusely reflected at the adhesive accumulation 112a to generate the stray light beam Y', and the inside of the third lens member L23 is irradiated with light, with the result that ghost may occur. In view of this, when the image plane side with respect to the cemented outer peripheral portion 112 and the upper side (radially outer side) with respect to the light beam Y-Y, that is, regions indicated by hatchings D and D' can be shielded from light, the stray light beam Y' that has been diffusely reflected at the adhesive accumulation 112a does not reach the image pickup surface 10, thereby being capable preventing occurrence of ghost.

In general, the outer periphery of the optical element is coated with a coating material having light-shielding property, and the stray light can be blocked by a coating film obtained by the coating. However, the light beam passes through the coating film and leaks depending on the film thickness of the coating film or the intensity of the light beam, with the result that such flare that a screen becomes entirely or partially bright may occur. Alternatively, such ghost that reddish brown, which is like color given when the coating color is transparently seen, covers the screen may occur.

In order to prevent such flare or ghost, it is required to manage the film thickness of the coating film. Therefore, when recoating is performed such that coating is repeated again after the coating is dried, the number of steps is increased, with the result that manufacturing cost is increased. Further, in an assembly step of the lens barrel, a step of checking whether or not the light beam leaks in the coated portion is added. Thus, assembly man-hour is increased, with the result that cost is increased.

Meanwhile, in the lens barrel to which the present disclosure is applied, the circumferential groove L23a having a substantially V shape is formed in the entire outer periphery of the third lens member L23 forming the second lens L2. The circumferential groove L23a is located on the rear side of the cemented outer peripheral portion 112 being the cemented portion in the direction of the optical axis X. In addition, the light-shielding ring 113 formed by molding the elastic material having light-shielding property is mounted in the circumferential groove L23a. With this, the stray light beam Y' is blocked and occurrence of ghost is prevented. As the material of the light-shielding ring 113, black PVC rubber is employed, but the material of the light-shielding ring 113 may be a stretchable material such as thermoplastic elastomer. The light-shielding ring 113 is stretched by utilizing the stretchability of the rubber to the extent that the radially outer portion of the third lens member L23 can pass through the light-shielding ring 113 so that the light-shielding ring 113 is fitted to the circumferential groove L23a. In this manner, the light-shielding ring 113 is brought into close contact with the radially innermost portion L23b of the circumferential groove L23a. As long as the radially innermost portion L23b is in close contact with the light-shielding ring 113, even when a slight gap is defined in other portions, the light beam does not pass through the circumferential groove L23a, thereby being capable of avoiding occurrence of ghost.

Figure 5:
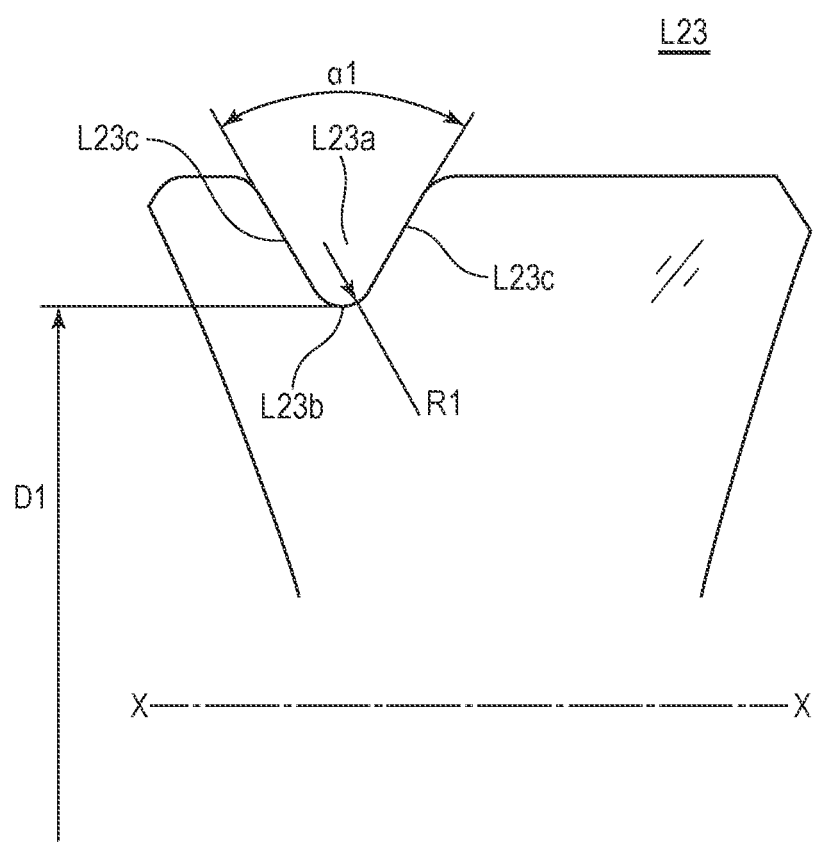
FIG. 5 is a sectional view for illustrating a shape of the circumferential groove (L23a) of the third lens member (L23).
Figure 6:
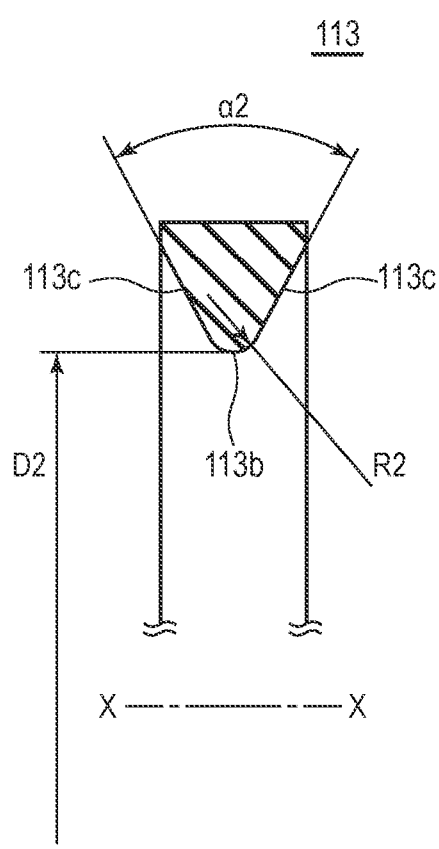
FIG. 6 is a sectional view for illustrating a shape of the light-shielding ring (113).

Next, with reference to FIG. 5 and FIG. 6, the shapes of the circumferential groove L23a and the light-shielding ring 113 are described. FIG. 5 is a sectional view for illustrating the shape of the circumferential groove L23a of the third lens member L23. FIG. 6 is a sectional view for illustrating the shape of the light-shielding ring 113, in which the light-shielding ring 113 is cut along a plane passing through the optical axis X.

As illustrated in FIG. 5, the circumferential groove L23a has a substantially V shape, and the radially innermost portion L23b of the V shape has an arc shape. A radius R1 of the arc is a minimum radius given at the time of processing the third lens member L23. The light beam reflected in an inner peripheral surface (optical axis X side) of the radius R1 also causes ghost. Thus, in order to reduce the area that causes reflection, it is preferred that the radius R1 be smaller. However, in order to perform cutting work on the lens material made of a hard glass material, it is required to set the radius R1 to a predetermined value or more in consideration of fracture of the lens material and wear of a cutting tool.

As illustrated in FIG. 6, a radially innermost portion 113b of the light-shielding ring 113 also has an arc shape, and a radius R2 of the radially innermost portion 113b is set smaller than the radius R1 of the circumferential groove L23a (see FIG. 4). The light-shielding ring 113 is a molded component made of rubber or a resin material, and hence the radius R2 can be reduced relatively easier. Further, a diameter φD2 of the radially innermost portion 113b of the light-shielding ring 113 before mounting is set smaller than a diameter φD1 of the radially innermost portion L23b of the circumferential groove L23a. Further, an angle α2 formed by side surfaces 113c of the light-shielding ring 113 before mounting is set smaller than an angle α1 formed by side surfaces L23c of the circumferential groove L23a (see FIG. 4).

With those dimension settings, when the light-shielding ring 113 is mounted, the light-shielding ring 113 can reliably enter the circumferential groove L23a up to the position at which the radially innermost portion 113b is brought into contact with the radially innermost portion L23b. It is preferred that the angle α1 and the angle α2 be set such that the side surfaces are brought into close contact with each other when the light-shielding ring 113 having elasticity is mounted. However, even when a slight gap is defined, there is no problem in light-shielding property.

With the configuration described above, the stray light beam Y' generated due to the adhesive accumulation 112a as illustrated in FIG. 4 is blocked by the light-shielding ring 113, thereby preventing occurrence of ghost. The circumferential groove L23a is located on the rear side of the cemented outer peripheral portion 112 being the cemented portion in the direction of the optical axis X. However, even in a configuration in which the circumferential groove L23a is located on the front side of the cemented outer peripheral portion 112 (in the second lens member L22), the stray light beam Y' can be blocked. That is, it is only required that the circumferential groove L23a be located in front of the cemented outer peripheral portion 112 or behind the cemented portion in the direction of the optical axis X. Further, it is preferred that the circumferential groove L23a be located in the vicinity of the cemented outer peripheral portion 112 in consideration of processing and the size of the circumferential groove L23a.

In the example of the present disclosure, the light-shielding member can be assembled to the optical element in a single component state before the optical element is assembled in the lens barrel. Thus, as compared to the case in which the optical element and the lens barrel are molded integrally, a load caused by heat is not applied to the optical element or the lens barrel. Accordingly, optical performance is not degraded. Further, the example of the present disclosure is adaptable to the cemented lens, thereby being capable of improving the degree of freedom in optical design. Further, even when the circumferential groove L23a formed in the outer periphery of the third lens member L23 is shielded from light by coating, the film thickness of the coating film can be further reduced, and man-hour can be reduced in manufacture and assembly. Thus, ghost can be prevented, and cost can be reduced as a result.

(Modification Examples)

Figure 7A:
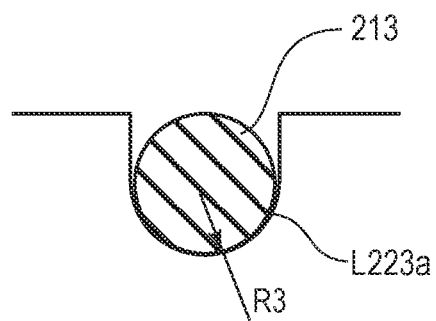
FIG. 7A, FIG. 7B, and FIG. 7C are partial sectional views for illustrating modification examples of the present disclosure, respectively.
Figure 7B:
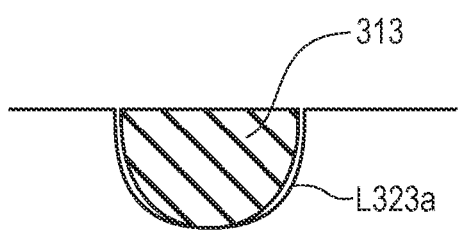
Figure 7C:
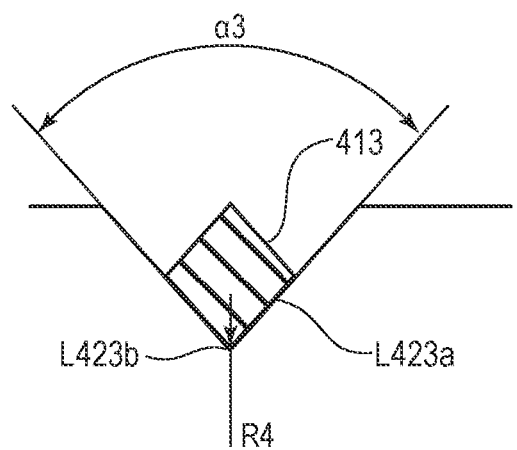

FIG. 7A, FIG. 7B, and FIG. 7C are illustrations of modification examples of the present disclosure, respectively. In the example of the present disclosure, the sectional shape of the light-shielding ring 113 being the light-shielding member is a substantially V shape in which the radially innermost portion 113b has the small radius R2. However, as the modification example, there may be used a light-shielding ring 213 (commercially available O-ring) having a circular shape in cross section of the light-shielding member as illustrated in FIG. 7A. In this case, a circumferential groove L223a having a U shape in cross section is formed, and it is only required that a circular-shaped portion of the light-shielding ring 213 be exactly fitted to a circular-shaped portion of the circumferential groove L223a when the light-shielding ring 213 is mounted. However, a radius R3 of the circumferential groove L223a is larger than the radius R1 of the V shape. Thus, it is required to check that ghost does not occur in stray light reflected on the inner peripheral surface having the radius R3. Further, a light-shielding ring 313 having a semi-circular shape in cross section as illustrated in FIG. 7B may be used as the light-shielding member. In this case, a circumferential groove L323a has a shallow U shape.

Further, a pulley belt 413 having a square shape in cross section as illustrated in FIG. 7C may be used as the light-shielding member. In this case, it is only required to set an angle α3 of a circumferential groove L423a to 90°, and it is only required to set a depth of the circumferential groove L423a (half the difference between a lens outer diameter and a diameter φD1) to a length of opposing corners of the square in the cross section of the belt 413. A radius R4 of an innermost peripheral portion L423b of the circumferential groove L423a can be set equal to that of the V shape. Thus, a commercially available belt made of rubber may be used when there is no space problem.

Although the configurations of the modification examples described above are different from the configuration of the example, the modification examples can achieve an object of the present disclosure to shield the stray light beam Y' generated when the light beam Y-Y is radiated onto the adhesive accumulation 112a. In the embodiment, the example, and the modification examples of the present disclosure, description has been made of the interchangeable lens for still image photography and moving image photography. The same effects may be obtained even in a lens barrel that is interchangeable such as a projection lens or an optical lens of a copying machine. Further, the lens barrel to which the present disclosure is applied is to be used in an image pickup apparatus including an image pickup element configured to pick up an image formed by the lens barrel or an image pickup system including an image pickup apparatus main body including an image pickup element, to which the lens barrel is removably mounted. Further, the present disclosure is applicable also to a lens-integrated image pickup apparatus. The embodiment, the example, and the modification examples described above are merely typical examples, and in carrying out the present disclosure, various modifications and changes may be made to the embodiment, the example, and the modification examples. The present disclosure is not limited to the embodiment, the example, and the modification examples.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-047297, filed Mar. 18, 2020, which is hereby incorporated by reference herein in its entirety.

What is claimed is:

1. An optical apparatus comprising:
a plurality of optical elements; and
a cemented lens formed by cementing with an adhesive, and the cemented lens has a cemented portion located on an outer periphery of the cemented lens,
wherein the cemented lens includes:
a cemented surface in which a concave lens and a convex lens are cemented together;
a groove formed in an outer periphery of the concave lens; and
an elastic member, which is provided in the groove, and is configured to shield light, the elastic member having a ring shape,
wherein a distance from an innermost peripheral portion of the groove formed in the cemented lens to an optical axis is shorter than a distance from the outer periphery of the cemented portion of the cemented lens to the optical axis, and
wherein the groove is located in an object side from the cemented portion or an image plane side from the cemented portion in a direction of the optical axis.

2. The optical apparatus according to claim 1, wherein the elastic member is in contact with the groove, and the groove is sealed by the elastic member.

3. The optical apparatus according to claim 1, wherein the elastic member is a ring made of black rubber.

4. The optical apparatus according to claim 1, wherein a distance between the groove and the cemented portion in the direction along the optical axis is shorter than a distance between the groove and an aperture member.

5. The optical apparatus according to claim 1, comprising:
an aperture member forming an opening configured to limit light,
wherein the aperture member is located in the object side of the cemented lens.

6. The optical apparatus according to claim 5, wherein a distance from the optical axis to the aperture member is shorter than a distance from the optical axis to the groove.

7. The optical apparatus according to claim 1, wherein the cemented portion is provided at a location on the outer periphery of the cemented lens that is an extension of the cemented surface.

8. An optical apparatus comprising:
an optical element;
a lens barrel configured to hold the optical element; and
a cemented lens formed by cementing with an adhesive, and the cemented lens has a cemented portion located on an outer periphery of the cemented lens,
wherein the cemented lens includes:
a cemented surface in which a concave lens and a convex lens are cemented together;
a groove formed in an outer periphery of the concave lens; and
a light-shielding member, which is provided in the groove, and is configured to shield light, and
wherein the light-shielding member is a member different from the lens barrel and is made of an elastic material,
wherein a distance from an innermost peripheral portion of the groove formed in the cemented lens to an optical axis is shorter than a distance from the outer periphery of the cemented portion of the cemented lens to the optical axis, and
wherein the groove is located in an object side from the cemented portion or an image plane side from the cemented portion in a direction of the optical axis.

9. An image pickup apparatus comprising:
an optical apparatus including a plurality of optical elements;
a cemented lens formed by cementing with an adhesive, and the cemented lens has a cemented portion located on an outer periphery of the cemented lens,
wherein the cemented lens includes:
a cemented surface in which a concave lens and a convex lens are cemented together;
a groove formed in an outer periphery of the concave lens; and
an elastic member, which is provided in the groove, and is configured to shield light, the elastic member having a ring shape,
wherein a distance from an innermost peripheral portion of the groove formed in the cemented lens to an optical axis is shorter than a distance from the outer periphery of the cemented portion of the cemented lens to the optical axis,
wherein the groove is located in an object side from the cemented portion or an image plane side from the cemented portion in a direction of the optical axis; and
an image pickup element configured to pick up an image formed by the optical apparatus.

10. The image pickup apparatus according to claim 9, wherein the optical apparatus is removably mounted to the image pickup apparatus.

* * * * *